US011677819B2

(12) United States Patent
Mermoud et al.

(10) Patent No.: US 11,677,819 B2
(45) Date of Patent: Jun. 13, 2023

(54) PEER-TO-PEER FEATURE EXCHANGE FOR EDGE INFERENCE OF FORECASTING MODELS

(71) Applicant: Cisco Technology, Inc., San Jose, CA (US)

(72) Inventors: Grégory Mermoud, Veyras VS (CH); Jean-Philippe Vasseur, Saint Martin D'uriage (FR); Pierre-André Savalle, Rueil-Malmaison (FR); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 556 days.

(21) Appl. No.: 16/831,222

(22) Filed: Mar. 26, 2020

(65) Prior Publication Data
US 2021/0304026 A1    Sep. 30, 2021

(51) Int. Cl.
| | | |
|---|---|---|
| *H04L 67/104* | (2022.01) | |
| *G06N 5/04* | (2023.01) | |
| *G06N 20/20* | (2019.01) | |
| *H04L 45/58* | (2022.01) | |
| *G06N 20/10* | (2019.01) | |
| *H04L 45/02* | (2022.01) | |
| *H04L 67/12* | (2022.01) | |
| *G06F 18/214* | (2023.01) | |

(52) U.S. Cl.
CPC .......... *H04L 67/104* (2013.01); *G06F 18/214* (2023.01); *G06N 5/04* (2013.01); *G06N 20/20* (2019.01); *H04L 45/58* (2013.01)

(58) Field of Classification Search
CPC ........ G06N 5/04; G06N 20/20; G06N 3/0445; G06N 20/10; G06K 9/6256; G06K 9/6267; H04L 45/58; H04L 67/104; H04L 45/08; H04L 67/12
See application file for complete search history.

(56) References Cited

U.S. PATENT DOCUMENTS

| | | | |
|---|---|---|---|
| 10,460,255 B2 | 10/2019 | Nagaraju et al. | |
| 2014/0297742 A1* | 10/2014 | Lyren ................. | H04L 67/1044 709/204 |
| 2019/0236485 A1 | 8/2019 | Stanley, III et al. | |
| 2019/0364492 A1* | 11/2019 | Azizi .................... | H04W 48/16 |

(Continued)

OTHER PUBLICATIONS

Chakraborty,etal.,"LearningfromPeersattheWirelessEdge",online:https://arxiv.org/pdf/2001.11567.pdf,Jan. 2020,6pages.*

(Continued)

*Primary Examiner* — Asghar H Bilgrami
(74) *Attorney, Agent, or Firm* — BEHMKE INNOVATION GROUP LLC; Kenneth J. Heywood; Jonathon P. Western

(57) ABSTRACT

In one embodiment, a network element in a network receives one or more machine learning models configured to make an inference about the network. The network element requests, according to a predefined peering plan, telemetry attribute data from one or more peer network elements specified by the peering plan. The network element receives the telemetry attribute data from the one or more peer network elements. The network element makes, using the one or more machine learning models, an inference about the network based in part on the received telemetry attribute data.

20 Claims, 8 Drawing Sheets

(56) References Cited

U.S. PATENT DOCUMENTS

2019/0370146 A1* 12/2019 Babu .................... G06F 11/3089
2021/0182996 A1*  6/2021 Cella ................... G06Q 30/0202
2022/0036302 A1*  2/2022 Cella ..................... H04L 9/3239
2022/0278889 A1*  9/2022 Malleshaiah .......... H04L 41/145

OTHER PUBLICATIONS

Pathan,etal.,"ArchitectureandPerformanceModelsforQoS-DrivenEffectivePeeringofContentDeliveryNetworks",online:https://arxiv.org/ftp/arxiv/papers/0907/0907.4876.pdf,Jul. 2009,20pages.*
Yadgar,etal.,"ModelingtheEdge:Peer-to-PeerReincarnated",HotEdge,(2019),11pages, USENIX.*
Vasseur, et al., "Path Computation Element (PCE) Communication Protocol (PCEP)", Network Working Group, Request for Comments 5440, Mar. 2009, 87 pages, IETF Trust.

* cited by examiner

PEER-TO-PEER FEATURE EXCHANGE FOR EDGE INFERENCE OF FORECASTING MODELS

TECHNICAL FIELD

The present disclosure relates generally to computer networks, and, more particularly, to peer-to-peer feature exchange for edge inference of forecasting models.

BACKGROUND

Networks are large-scale distributed systems governed by complex dynamics and very large number of parameters. In general, network assurance involves applying analytics to captured network information, to assess the health of the network. For example, a network assurance service may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

With the recent proliferation of machine learning techniques, new opportunities have arisen with respect to monitoring a network. Indeed, machine learning has proven quite capable of analyzing complex network patterns and identifying problems that might otherwise be missed by a network administrator. In some cases, a machine learning-based network assurance system may even be able to predict problems before they occur, allowing for corrective measures to be taken in advance.

The forecasting of key performance indicators (KPIs) for a network is a critical requirement to predicting network problems before they occur. However, KPI forecasting is often network-specific, as each network may include different networking entities with varying capabilities and configurations. In addition, deploying KPI forecasting models to the edge of a network (e.g., directly on a networking element, such as on a router) can be particularly challenging when the models use features constructed from the state of multiple entities in the network.

DESCRIPTION OF EXAMPLE EMBODIMENTS

Overview

Figure 1A:
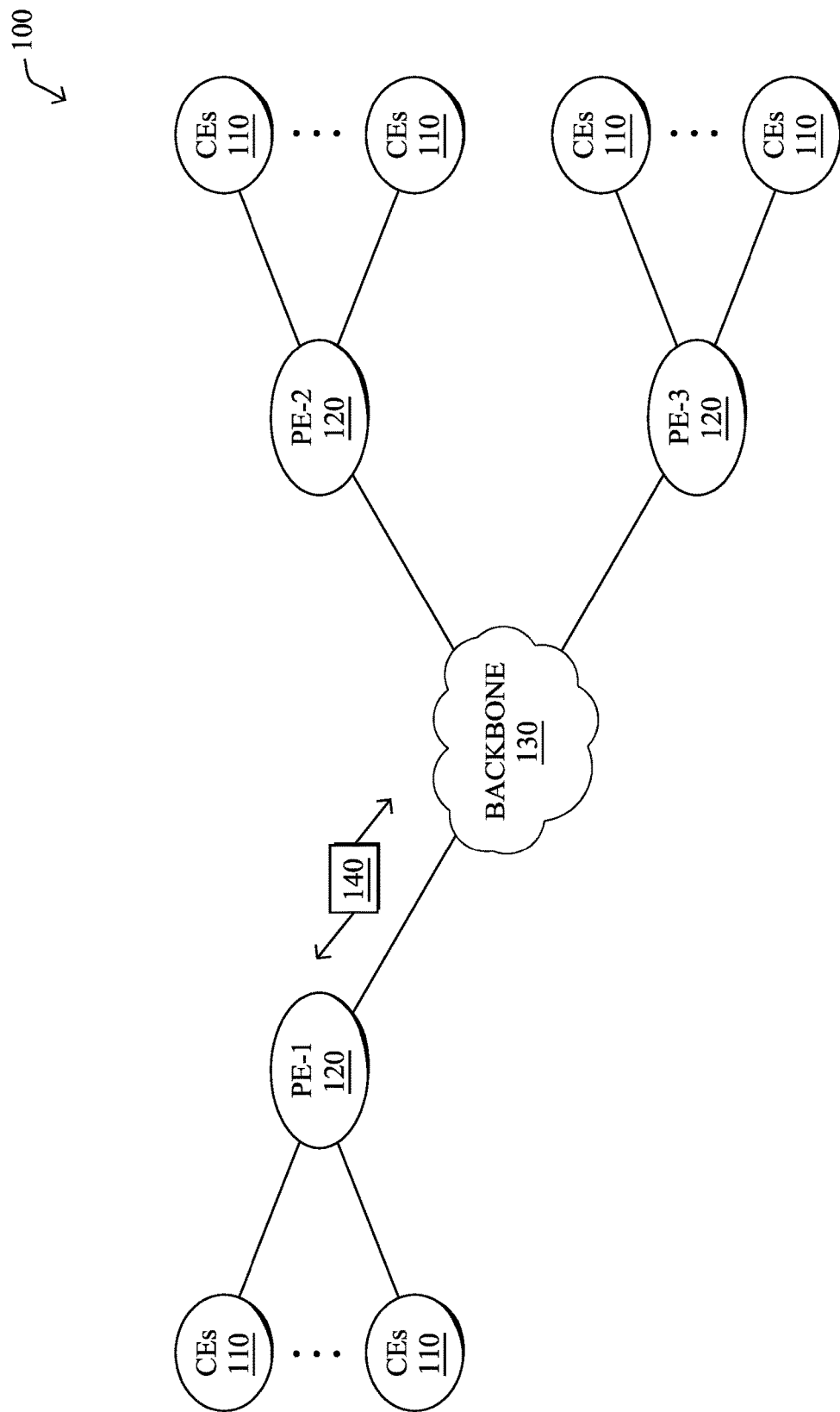
FIGS. 1A-1B illustrate an example communication network.

According to one or more embodiments of the disclosure, a network element in a network receives one or more machine learning models configured to make an inference about the network. The network element requests, according to a predefined peering plan, telemetry attribute data from one or more peer network elements specified by the peering plan. The network element receives the telemetry attribute data from the one or more peer network elements. The network element makes, using the one or more machine learning models, an inference about the network based in part on the received telemetry attribute data.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
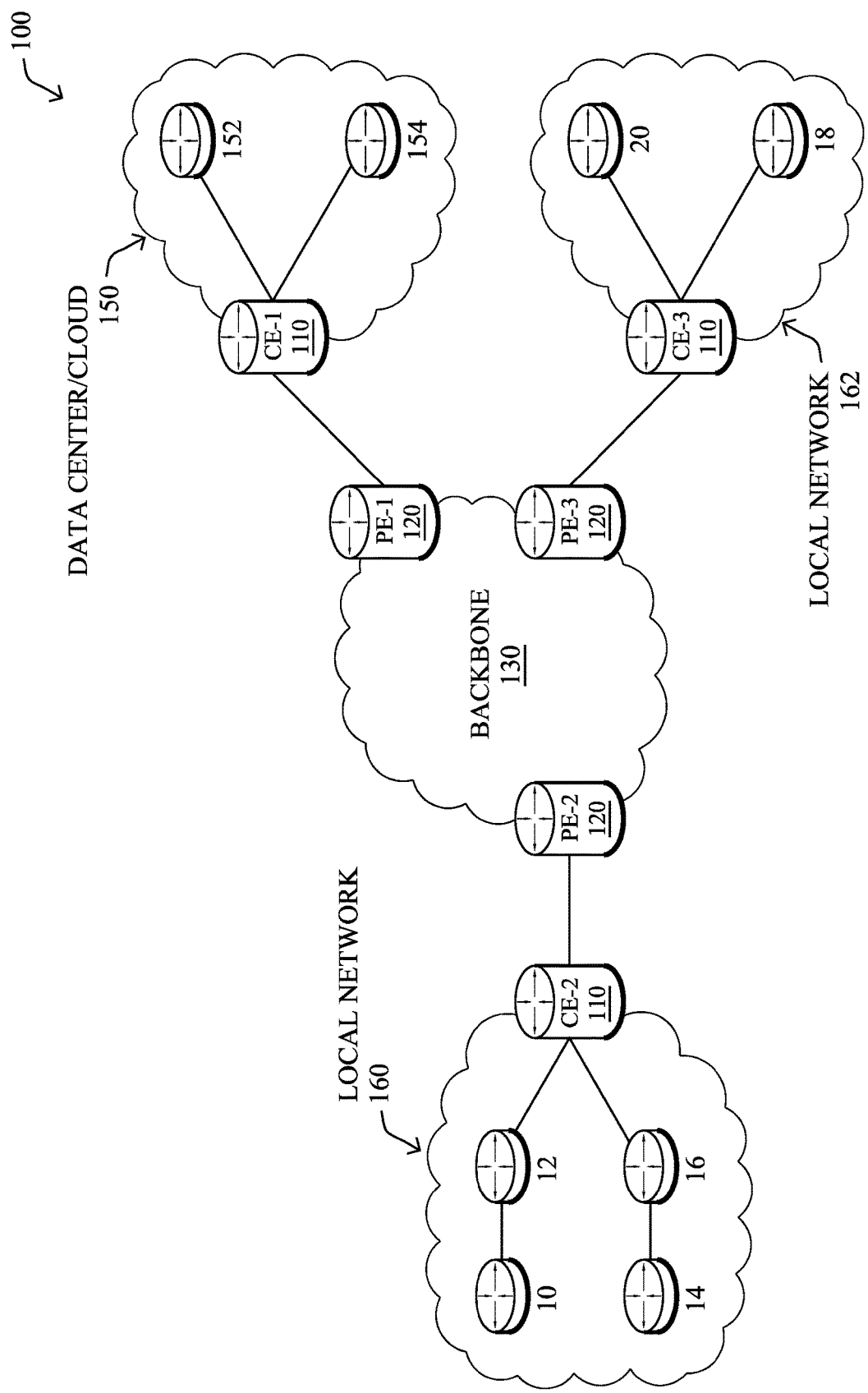

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
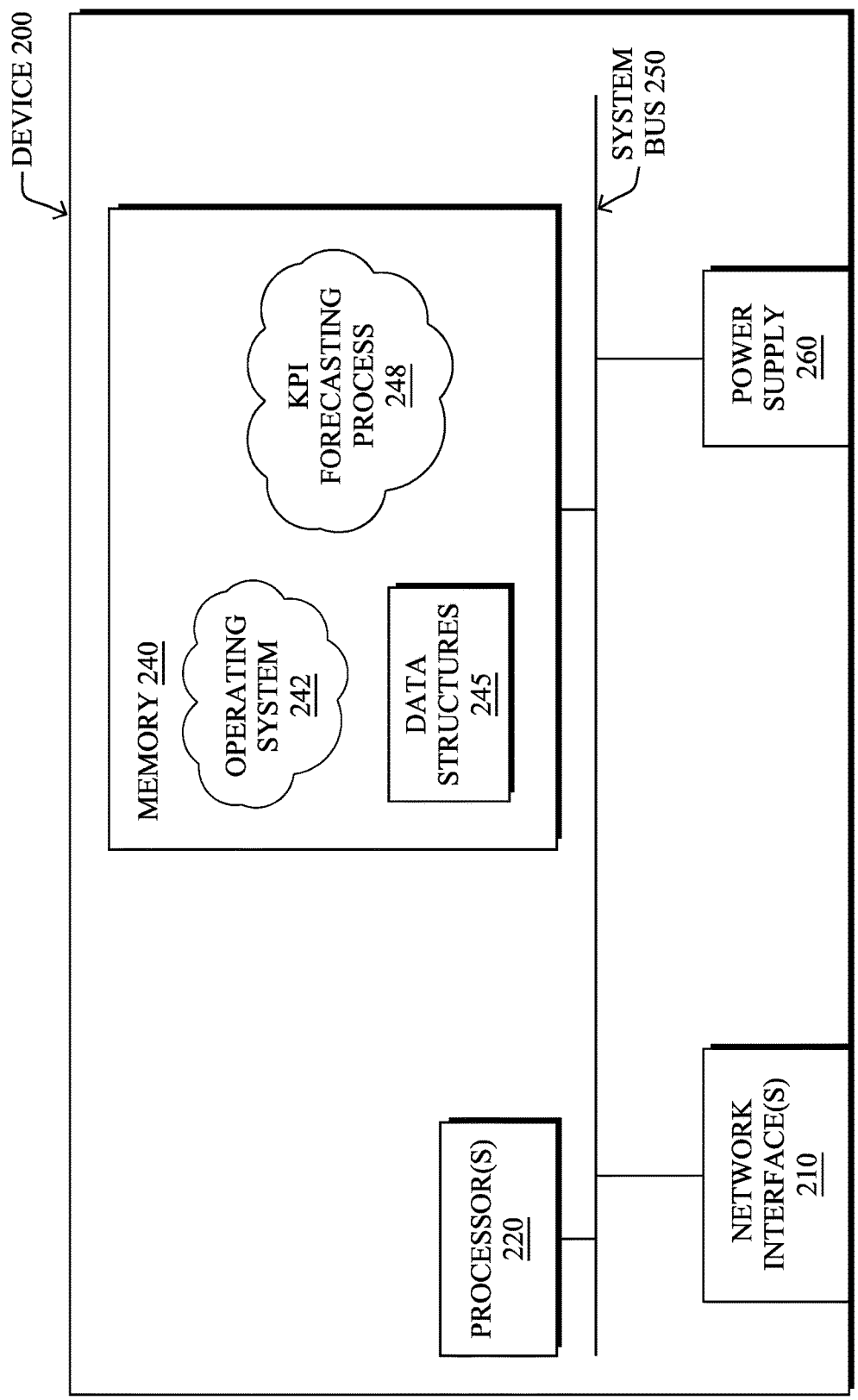
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a key performance indicator (KPI) forecasting process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

KPI forecasting process 248 includes computer executable instructions that, when executed by processor(s) 220, cause device 200 to perform KPI forecasting as part of a network monitoring infrastructure for one or more networks.

In some embodiments, KPI forecasting process 248 may utilize machine learning techniques, to forecast KPIs for one or more monitored networks. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, KPI forecasting process 248 may employ one or more supervised, unsupervised, or semi-supervised machine learning models. Generally, supervised learning entails the use of a training set of data, as noted above, that is used to train the model to apply labels to the input data. For example, the training data may include samples of 'good' operations and 'bad' operations and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior, as in the case of unsupervised anomaly detection. Semi-supervised learning models take a middle ground approach that uses a greatly reduced set of labeled training data.

Example machine learning techniques that KPI forecasting process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest classification, deep learning models, or the like.

The performance of a machine learning model can be evaluated in a number of ways based on the number of true positives, false positives, true negatives, and/or false negatives of the model. For example, consider the case of a machine learning model that predicts whether a network tunnel is likely to fail. In such ca case, the false positives of the model may refer to the number of times the model incorrectly predicted that the tunnel would fail. Conversely, the false negatives of the model may refer to the number of times the model incorrectly predicted that the tunnel would not fail. True negatives and positives may refer to the number of times the model correctly predicted whether the tunnel would operate as expected or is likely to fail, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
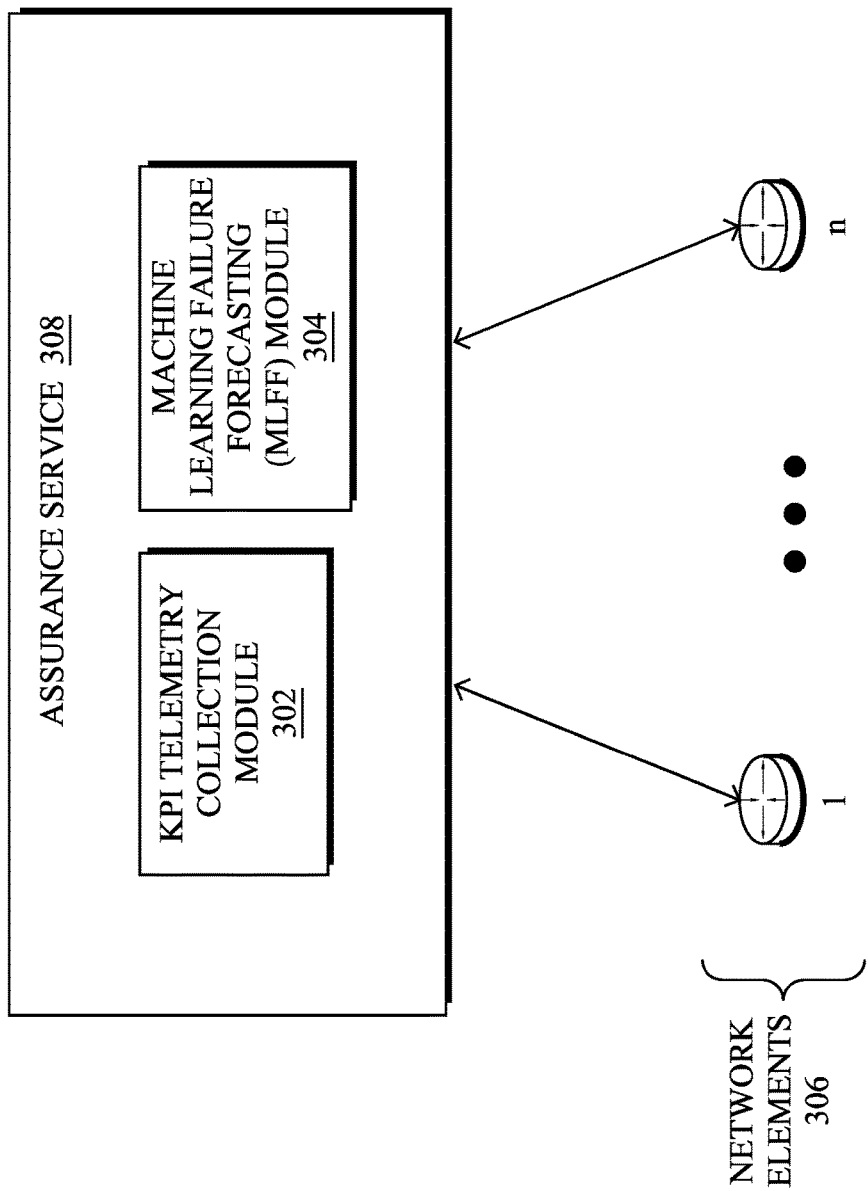
FIG. 3 illustrates an example architecture for performing network assurance in a network.

FIG. 3 illustrates an example architecture 300 for performing network assurance in a network, according to various embodiments. At the core of architecture 300 is an assurance service 308 that is responsible for overseeing the operations of network elements 306. As shown, assurance service 308 may include the following components: a KPI telemetry collection module 302 and a machine learning failure forecasting (MLFF) module 304. These components 302-304 may be implemented in a distributed manner or implemented as their own stand-alone services, either as part of the network under observation or as a remote service. In addition, the functionalities of the components of architecture 300 may be combined, omitted, or implemented as part of other processes, as desired.

Assurance service 308 may be in communication with any number of network elements 306 (e.g., a first through $n^{th}$ device), such as CE routers 110, described previously, or any other form of networking device found in a network (e.g., access points, switches, routers, etc.). In general, the goal of assurance service 308 is to ensure that the network(s) associated with networking elements 306 continue to function properly and forecast any failures before they occur. For example, in one embodiment, network elements 306 may be part of the same software defined WAN (SD-WAN) and the forecasting may entail predicting when SD-WAN tunnels will fail. In another embodiment, network elements 306 may be located in one or more wireless networks and the goal of assurance service 308 is then to predict onboarding failures, roaming failures, and the like. As would be appreciated, architecture 300 is flexible and be applied to any number of different network types and predictions.

By way of example, there are typically many circumstances in a network that can lead to tunnel failures in various areas of the network between a head-end and tail-end router (e.g., between routers 110, etc.). An objective of MLFF 304, as detailed below, is to learn early signs (networking behavioral) that have some predictive power, allowing the model to predict/forecast a failure. It is expected that some failures are predictable (i.e., there exist early signs of an upcoming failure) while others will not be non-predictable (e.g., fiber cut, router crash, etc.). More specifically, almost all failures exhibit early signs, but those signs may appear only a few milliseconds (or even nanoseconds), prior to the failure (e.g. fiber cut), thereby making forecasting an almost impossible task. Some non-predictable failures may be due to the absence of signaling back to the network element 306 involved and may be localized to the core of the service provider network (e.g., the underlying IP, 4G, 5G, etc. network), in which case the failure is non-predicable from the perspective of the network element 306.

A first aspect of architecture 300 relates to telemetry collection module 302 obtaining the KPI telemetry data required for model training by MLFF module 304. As used herein, the term 'relevant telemetry' refers to a telemetry measurement variable with predictive power to predict failures in a network, which can be determined dynamically by MLFF module 304. Indeed, failures may be predictable, yet not successfully predicted, due to a lack of relevant telemetry, the inability of the model to predict the failure, or the telemetry is sampled at too coarse of a time granularity. In some embodiments, to obtain relevant telemetry from network elements 306, service 308 may send a custom request to one or more of network elements 306 with the objective of obtaining the list of events of interest along with the set of candidate telemetry variables with potential predictive power to predict failures. In further embodiments, network elements 306 may instead provide the telemetry data to service 308 on a push basis (e.g., without service 308 first requesting the telemetry data).

In various embodiments, KPI telemetry collection module 302 may adjust the set of telemetry variables/parameters obtained from the network element(s) 306 and/or their sampling frequency. If, for example, MLFF module 304 determines that a particular telemetry variable has a strong predictive power (according to the feature importance, Shapley values, etc.), the frequency at which such a variable may be gathered may be higher compared to a variable with lower predictive power. MLFF module 304 may also determine the predictive power of a particular KPI telemetry variable by assessing the conditional probabilities involved, in further embodiments.

MLFF module 304 may also select the set of most relevant telemetry variables. In turn, telemetry collection module 302 may request that network elements 306 measure and send these variables to service 308 periodically, since real-time variations of such telemetry is needed for forecasting tunnel down events or other network failures. For example, based on the above conclusion, MLFF module 304 may determine that the CPU and memory utilizations of one or more networking devices that support a given tunnel should be sent periodically (e.g., every 1 second) by network elements 306.

KPI telemetry collection module 302 may also request other KPI telemetry variables from device(s) 306 in response to the occurrence of certain events, such as during a rekey failure when the edge router is not able to successfully exchange the security keys with the controller. Since such events are rare and the states of the variables remain the same for longer periods of time, telemetry collection module 302 may request an event-based push request, rather than periodic messages. In other words, telemetry collection module 302 may instruct one or more of network elements 306 to report certain telemetry variables only after occurrence of certain events. For example, Table 1 below shows some example telemetry variables and when a network element 306 may report them to service 308, as in the case of predicting tunnel failures:

TABLE 1

| Relevant Telemetry | Request Type |
| --- | --- |
| Memory_utilization<br>CPU Utilization | Requested from head and tail edge routers. |
| BFD Probe Latency, Loss and Jitter<br>Queue statistics (%-age drops for different queues) | Periodically once every 1 second. |
| Interface down event<br>Rekey exchange failure<br>Router crash logs | Requested from both head and tail edge routers<br>Upon event occurrence. |

In a further embodiment, MLFF module 304 may also attempt to optimize the load imposed on the network element(s) 306 reporting the telemetry variables to service 308. For example, MLFF module 304 may determine that the CPU and memory usages should be measured and reported every minute to service 308.

A key functionality of MLFF module 304 is to train any number of machine learning-based models to predict failures by forecasting network KPIs. Preferably, the models are time-series models trained centrally (e.g., in the cloud) using the telemetry collected by telemetry collection module 302. In one instantiation of MLFF module 304, the models may be trained on a per customer or per-network basis. Testing has shown that model performance may be influenced by parameters specific to a given network instantiation, thus promoting an implementation whereby MLFF module 304 trains a model for a specific network deployment. In further embodiments, MLFF module 304 may even train certain models on a per-tunnel or other network entity basis. Although such an approach may be of limited scalability, it may be highly valuable for tunnels carrying a very large amount of potentially very sensitive traffic (e.g., inter-cloud/data center traffic).

As pointed out earlier, with current reactive routing approaches, recall (i.e., the proportion of failures being successfully predicted) is simply equal to 0, since rerouting is always reactive. In other words, the system reacts a posteriori. As a result, any recall>0 is a significant gain. One performance metric that MLFF module 304 may consider is the maximum recall (Max_Recall) achieved by the model given a precision>P_Min. For example, MLFF module 304 may evaluate the variability of Max_Recall across datasets, should a single model be trained across all datasets, to determine whether a network-specific or even a tunnel or other entity-specific model should be trained.

In various embodiments, MLFF module 304 may dynamically switch between per-tunnel, per-customer/network, and global (e.g., multiple networks) approaches to model training. For example, MLFF module 304 may start with the least granular approach (e.g., a global model across all customers/networks) and then evaluate the performance of the global model versus that of per-customer/network models. Such model performance comparison could be easily evaluated by comparing their related precision-recall curves (PRCs)/area under the curve (AUCs), or the relative Max_Recall, given that Precision>P_min.

In some cases, MLFF module 304 may employ a policy to trigger per-customer/network specific model training, if the Max_Recall value improvement is greater than a given threshold. In another embodiment, a similar policy approach may be used to specifically require a dedicated model for a given tunnel or other network entity according to its characteristic (between router A and router B), the type of traffic being carried out (e.g., sensitive traffic of type T, etc.), or the performance of the global or specific model for that entity. In such a case, the network elements 306 may be in charge of observing the routed traffic and, on detecting a traffic type matching the policy, request specific model training by MLFF module 304, to start per-tunnel model training for that tunnel.

Prototyping of the techniques herein using simple models and input features based on coarse KPI telemetry, such as 1-minute averages of loss, latency, jitter, traffic, as well as CPU/memory of CE routers, lead to recalls in the range of a few percent with a precision of 80% or more. More advanced time-series models, such as long short-term memories (LSTMs), especially with attention mechanisms, will achieve even better performance. More importantly, using richer and more fine-grained telemetry is an important driver of the forecasting performance.

Once MLFF module 304 has trained a prediction model, different options exist for its inference location (e.g., where the model is executed to predict tunnel failures). In a first embodiment, model inference is performed centrally (in the cloud), thus co-located with the model training. In such a case, once MLFF module 304 identifies the set of telemetry variables with predictive power (used for prediction), telemetry collection module 302 may send a custom message to the corresponding network element(s) 306 listing the set of variables along with their sampling/reporting frequencies. Note that sampling is a dynamic parameter used by MLFF module 304 computed so as to optimize the PRC of the model against the additional overhead of the network element 306 pushing additional data to the cloud (and also generating additional logging of data on the router).

In another embodiment, MLFF module 304 may push the inference task, and the corresponding prediction model, to a specific network element 306, so that the prediction is preformed on-premise. Such an approach may be triggered by the frequency of sampling required to achieve the required model performance. For example, some failure types are known to provide signal a few seconds, or even milliseconds, before the failure. In such cases, performing the inference in the cloud is not a viable option, making on-premise execution of the model the better approach. Inference/model execution is usually not an expensive task on premise, especially when compared to model training. That being said, it may require fast processing on local event with an impact on the local CPU. In yet another embodiment, some models may be executed on premise, if the local resources on the router/network element 306 are sufficient to feed the local model.

Thus, in some cases, the techniques herein support centralized model training (e.g., in the cloud), combined with the ability to perform local (on-premise) inference based on the required sampling frequency, local resources available on the network element 306, as well as the bandwidth required to send the telemetry for input to a model in the cloud. For example, one failure prediction model may require a slow sampling rate but a large amount of data, due to a high number of input features with predictive power. Thus, reporting these telemetry variables to the cloud for prediction may consume too much WAN bandwidth on the network. In such a case, MLFF module 304 may take this constraint into account by evaluating the volume of required telemetry, according to the sampling frequency, and the WAN bandwidth allocated on the network for the telemetry traffic. To that end, MLFF module 304 may analyze the topology of the network and the available bandwidth for telemetry reporting (e.g., according to the QoS policy). If the bandwidth available for the telemetry used for the inference of the model exceeds the capacity, MLFF module 304 may decide to activate a local inference by pushing a prediction model to one or more of network elements 306.

In yet another embodiment, MLFF module 304 may take a mixed approach whereby some of network elements 306 perform the inferences locally, while others rely on assurance service 308 to perform the predictions.

A further embodiment of the techniques herein introduces a feedback mechanism whereby feedback regarding the predictions by a trained model is provided to assurance service 308. In cases in which the model is executed on a network element 306, the network element 306 may report the rate of false positives and/or false negatives assurance service 308. Optionally, the reporting can also include additional context information about each false positive and/or false negative, such as the values of the telemetry variables that led to the incorrect prediction. If the performance of the model is below a designated threshold, assurance service 308 may trigger MLFF module 304 to retrain the model, potentially increasing the granularity of the model, as well (e.g., by training a tunnel-specific model, etc.). In cases in which MLFF module 304 trains multiple prediction models, service 308 may evaluate the performance of each model and, based on their performances, decide that a particular one of the models should be used. Such an approach allows MLFF module 304 to dynamically switch between models, based on the data pattern currently being observed.

When failures are predicted in the cloud by assurance service 308, service 308 may similarly receive feedback from network elements 306 regarding the predictions. For example, once a model M predicts the failure of a tunnel at a given time, MLFF module 304 may send a notification to the affected network element 306 indicating the (list of) tunnel(s) for which a failure is predicted, along with the predicted time for the failure, and other parameters such as the failure probability Pf (which can be a simple flag, a categorical variable (low, medium, high) or a real number). The network element 306 may use Pf to determine the appropriate action, such as pro-actively rerouting the traffic that would be affected by the failure onto a backup tunnel. In one embodiment, the predicted failure may be signaled to the network element 306 using a unicast message for one or more tunnels, or a multicast messages signaling a list of predicted failure to a set of network elements 306.

Regardless of how service 308 receives its feedback, either from the network element 306 executing the prediction model or from MLFF module 304 executing the model, service 308 may dynamically trigger MLFF module 304 to retrain a given model. In one embodiment, the model re-training may be systematic. In another embodiment, upon reaching a plateau in terms of improvement for Max_Recall or Max_Precision, service 308 may reduce the frequency of the model training.

As would be appreciated, while architecture 300 is described above primarily with respect to predicting tunnel failures in an SD-WAN, architecture 300 can be used for any number of different network assurance purposes. For example, KPIs in a wireless network can equally be used to forecast failures using architecture 300. In such a case, network elements 306 may instead take the form of wireless access points (APs), wireless LAN controllers (WLCs), switches, routers, or the like, and the KPIs may include values such as received signal strength indicator (RSSI) values, DHCP metrics, AP client counts, and the like. Such information can then be used to forecast failures such as onboarding issues, roaming failures, etc.

Figure 4A:
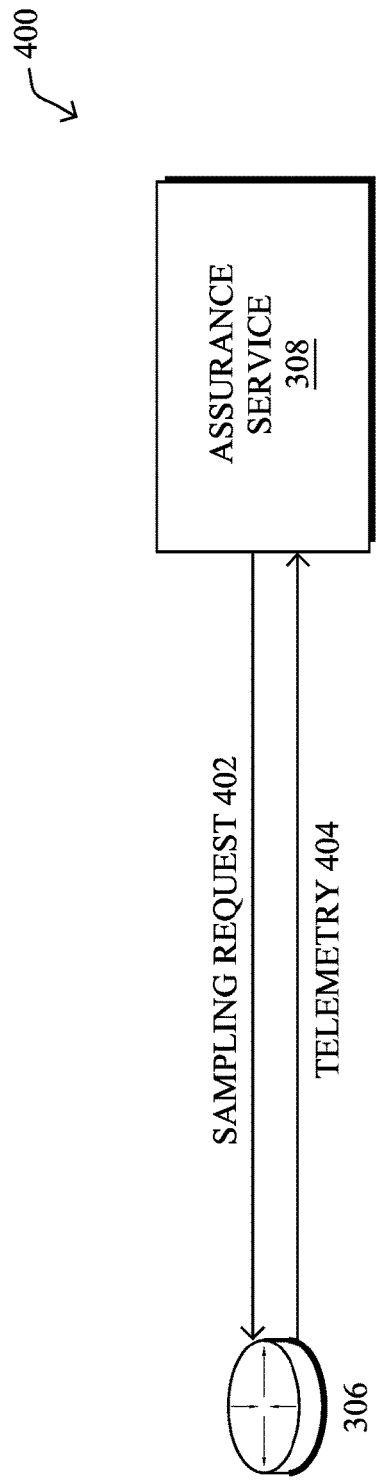
FIGS. 4A-4C illustrate examples of the interactions of a network element and a network assurance service.
Figure 4B:
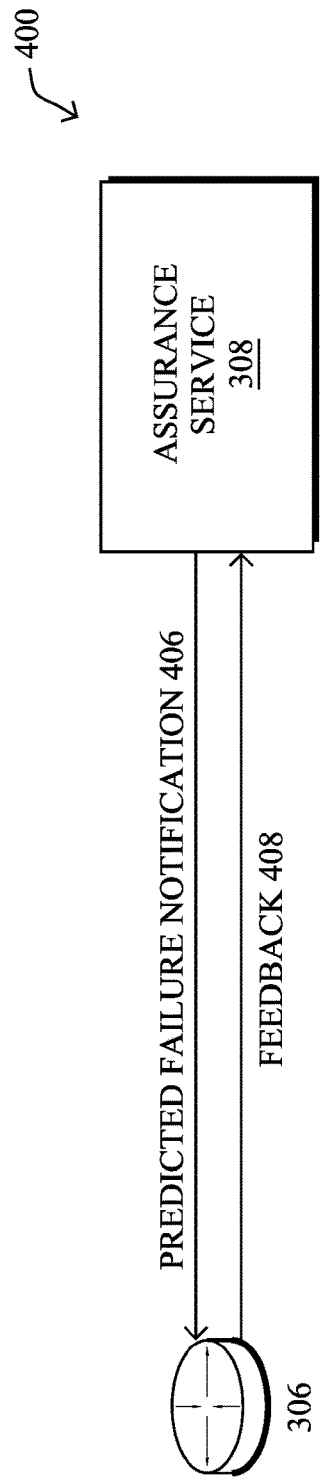
Figure 4C:
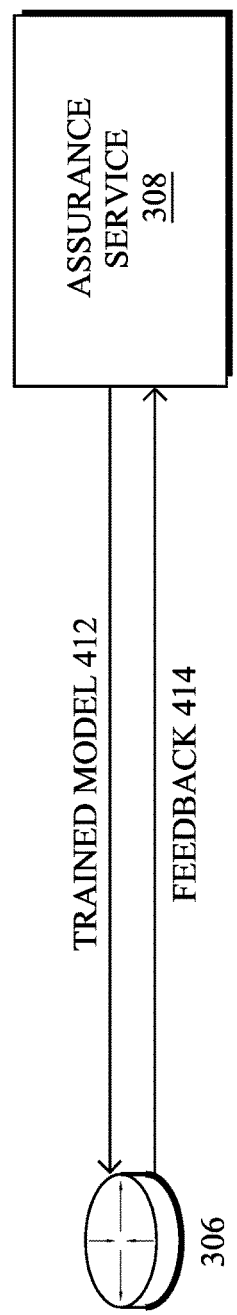

FIGS. 4A-4C illustrate examples of feedback for tunnel failure predictions, in various embodiments. As shown in example implementation 400 in FIGS. 4A-4B, assume that the trained model is executed in the cloud by assurance service 308. In such a case, service 308 may send a sampling request 402 to a network element 306 that indicates the telemetry variables to sample and report, as well as the determined sampling/reporting period(s) for those variables. In turn, network element 306 may report the requested telemetry 404 to service 308 for analysis. For example, service 308 may request that network element 306 report is CPU load every minute to service 308, to predict whether the tunnel associated with network element 306 is predicted to fail. More specifically, service 308 may use telemetry 404 as input to its trained prediction model, to determine whether telemetry 404 is indicative of a failure that will occur in the future.

When assurance service 308 determines that a failure is predicted, it may send a predicted failure notification 406 to network element 306 that identifies the tunnel or other network entity predicted to fail (e.g., a link, a device, etc.), the time at which the failure is expected to occur, and potentially the probability of failure, as well. Depending on the timing and probability of failure, network element 306 may opt to reroute the affected traffic, or a portion thereof, or take other corrective measures. In turn, network element 306 may monitor the entity predicted to fail and provide feedback 408 to service 308 indicating whether the tunnel actually failed and, if so, when. Service 308 can then use feedback 408 to determine whether model retraining should be initiated, such as by training a more granular model.

FIG. 4C illustrates an alternate implementation 410 in which assurance service 308 pushes the failure prediction model to network element 306 for local/on-premise inference. For example, service 308 may opt for network element 306 to perform the local inferences, such as when model 412 requires too much bandwidth to send the needed telemetry to service 308 for cloud-based prediction. In turn, network element 306 may use the corresponding telemetry measurements as input to trained model 412 and, if a failure is predicted, perform a corrective measure such as proactively rerouting the traffic to one or more other tunnels. In addition, network element 306 may provide feedback 414 to service 308 that indicates false positives and/or false negatives by the model. For example, if network element 306 reroutes traffic away from a tunnel predicted by model 412 to fail, and the tunnel does not actually fail, network element 306 may inform service 308. Service 308 may use feedback 414 to determine whether model 412 requires retraining, such as by adjusting which telemetry variables are used as input to the model, adjusting the granularity of the training (e.g., by using only training telemetry data from the tunnel, etc.), or the like.

As noted above, machine learning inference can also be achieved directly on a network element by locally executing one or more machine learning forecasting model. A key observation is that the performance of such a model can be enhanced using telemetry attribute data from peers of the network element. This presents certain challenges, however, in identifying the correct peers to source the data, as well as the impact of this data on the forecasting model (e.g., the performance impact if the data is not received).

—Peer-to-Peer Feature Exchange for Edge Inference for Forecasting Models—

The techniques herein allow for machine learning inferences to be made by locally executing forecasting models on a networking entity, such as at the edge of a network. In particular, the techniques herein introduce a series of mechanisms that allow for peer network entities to share telemetry attribute data with one another for their local inferences based on a peering between entities and potentially at different levels of abstractions (i.e., modalities).

Specifically, according to one or more embodiments of the disclosure as described in detail below, a network element in a network receives one or more machine learning models configured to make an inference about the network. The network element requests, according to a predefined peering plan, telemetry attribute data from one or more peer network elements specified by the peering plan. The network element receives the telemetry attribute data from the one or more peer network elements. The network element makes, using the one or more machine learning models, an inference about the network based in part on the received telemetry attribute data.

Illustratively, the techniques described herein may be performed by hardware, software, and/or firmware, such as in accordance with the KPI forecasting process 248, or another process, which may include computer executable instructions executed by the processor 220 (or independent processor of interfaces 210) to perform functions relating to the techniques described herein.

Figure 5:
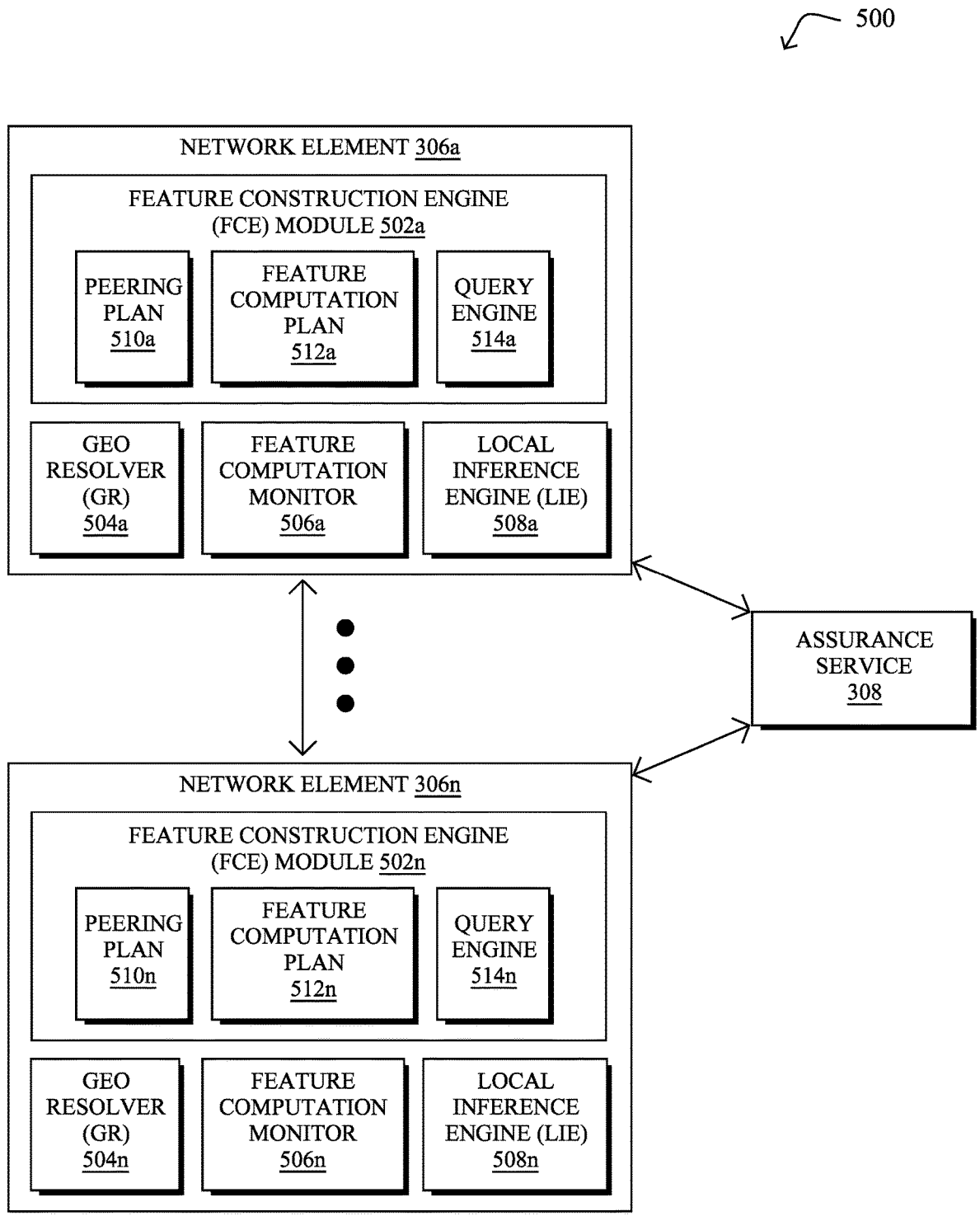
FIG. 5 illustrates an example architecture for peer-to-peer feature exchange for edge inference for forecasting models.

Operationally, FIG. 5 illustrates an example architecture 500 for peer-to-peer feature exchange for edge inference for forecasting models, according to various embodiments. Continuing the example of FIG. 4, assume that there are a set of network elements 306 (e.g., a first network element 306a through $n^{th}$ network element 306n) that are in communication with assurance service 308 or another centralized assurance service. As shown, each network element 306 may execute any or all of the following components: a feature construction engine (FCE) module 502, a geo resolver (GR) 504, a feature computation monitor 506, and/or a logical inference engine (LIE) 508. In various embodiments, some or all of components 502-508 may be executed instead by service 308 in a centralized manner.

In various embodiments, FCE modules 502a-502n may form a peer-to-peer network responsible for the extraction of relevant attributes from the stream of raw telemetry data and the construction of features. Such attributes are then used as input to the corresponding LIE 508a-508n on the local network element 306 and/or forwarded to any number of other peer FCE modules 502. To this end, assurance service 308, which trains the models deployed to network elements 306, may send each network element 306a-306n an execution plan for use by its FCE module 502 that comprises the following:

A peering plan 510—this may consist in a data structure of the form Map<Modality, Set<Peers>>. For every modality (e.g., geographical, L2/L3 topology, autonomous systems, etc.), a set of peers is specified. For instance, in the case of network assurance in wireless networks, a set of peers for the geographical modality may include all the wireless APs that are on the same floor at a distance of less than 25 meters. Every peer in a peering plan 510 may be identified using a network identifier, such as its IP address, and associated with a set of attributes that the peer may collect and provide.

A feature computation plan 512—this plan describes how features should be computed by the network element 306 from a plurality of data sources that are local (i.e., available directly on the local network element 306) and/or remote (i.e., obtained from peers). For example, each feature in a feature computation plan 512 may be identified by a name and the computation plan 512 expressed a SQL-like statement or in another suitable format.

By way of example, the following pseudocode may represent a particular feature computation plan 512:
SELECT
RSSI as LocalRSSI,
AVG(Geo.RSSI)
  OVER (PARTITION BY Geo)
  AS AvgNeighborRSSI,
AVG(L2.ClientCount)
  OVER (PARTITION BY L2)
  AS AvgL2ClientCount
Such a feature computation plan 512 will instruct the network element 306 to produce three features, which can be used as input to a machine learning-based forecasting model:

LocalRSSI, which is the local RSSI of the network element.

AvgNeighborRSSI, which is the average RSSI across its peers for the Geo modality (e.g., on the same floor, etc.).

AvgL2ClientCount, which is the average client count across its peers at L2 level (i.e., those APs connected to the same switch).

In a typical embodiment, a peering plan 510 and feature computation plan 512 may be computed for each network element 306 in a centralized and interactive manner, such as at assurance service 308. This allows a developer or other user to interact with assurance service 308 to build such features for the models executed by network elements 306. In a further embodiment, either or both of plans 510-512 may be generated automatically, either locally on the network element 306 or at assurance service 308, based on one or more configuration files.

As noted previously, there are many networking use cases where inference will take place at the edge and features will require to gather telemetry from neighboring nodes. For example, such inferences may be made in the context of wireless networks where having visibility on the signal quality from neighbors can be very useful in a number of situations. Similarly, when machine learning is used to predict tunnel failures in an SD-WAN, for instance, knowing the state of the tail-end of an IPSec tunnel (e.g., CPU, etc.) can be used to predict the timeout of BFD probes leading to tunnel failure. In yet another example, predictions made in the context of deterministic networking (DETNET) could make use of downstream link states, so as to make use of packet replications upstream, etc. As would be appreciated, the peer-to-peer approach introduced herein can be used across a wide range of different use cases in a monitored network.

Another sub-module of FCE module 502 may be query engine 514 that is responsible for taking feature computation plan 512 as input and automatically querying the corresponding peers for the required remote attributes. For example, continuing the example of wireless network assurance, these remote attributes may be RSSI measurements for the peers listed in the Geo modality of the plan 512 (e.g., APs on the same floor) and the client counts for the peers listed, in the L2 modality. To this end, query engine 514 may send a custom <Request_Attribute> message that can be defined as follows in Backus-Naur notation:
<Request_Attribute>::
=<AttributeName><StartTs><SamplingInterval>
<ChunkSize>[<EndTs>]
where <AttributeName> designates the attribute to be returned, <StartTs> designates the first timestamp to be returned, <SamplingInterval> designates the interval between two samples, <ChunkSize> designates the number of samples that may be accumulated in a single payload, and <EndTs> designates an optional timestamp indicative of when the sampling should stop. In turn, the requested peers may send the requested remote attributes back to the requesting query engine 514.

In another embodiment, query engine 514 may adopt a 'push' strategy rather than a 'pull' strategy. In such a case, rather than requesting the remote attributes via an explicit <Request_Attribute> message each time, query engine 514 may instead instruct each peer to periodically push the requested attributes to query engine 514.

A further component of architecture 500 is Geo Resolver (OR) 504, which is in charge of determining the set of logical neighbors (peers) in the Geo modality. In various embodiments, GR 504 may be executed centrally at assurance service 308 or instantiated on network elements 306a-306n (e.g., at the network edge). For example, in some cases, the Geo modality determined by a GR 504 may be tied to the routing adjacency (the routing neighbor) of the network element 306. In this case, GR 504 may determine the peer-list (set of peers involved in the Geo modality) from the routing tables of the network element 306 (e.g., the active routing adjacencies).

In another example, the Geo modality determined by GR 504 may be related to a specific overlay technology (e.g., an IPSec tunnel tail-end). In this case, the peer-list computed by GR 504 may indicate the set BFD peers of the network element 306.

When the Geo modality refers to a physical geographical dimension (e.g., on the same floor, within X meters, . . . ), rather than a network relationship, GR 504 may rely on other networking entities, such as a Wi-Fi tracking engine or the like, which can be used to return a list of "peers" within a certain diameter or x-number of meters, on a particular location (e.g., a floor, building, etc.).

In some cases, a network element 306 may leverage a signaling protocol to request data collection from the peer-list computed by GR 504 and used to build local features. For example, the Path Communication Element (PCE) Communication Protocol (PCEP) may be suitable for this task, leveraging PCReq and PCRep messages for the signaling. Another approach could be to piggyback a custom type-length-value (TLV) that includes the <Request_Attribute> object within a routing message, such as an Open Shortest Path First (OSPF) Opaque link state packet (LSP) Type 0 or an Intermediate System to Intermediate System (ISIS) LSP.

According to various embodiments, a feature computation monitor 506 may be configured to determine whether a particular feature computation plan 512 can be executed. Indeed, there are circumstances that may prevent execution of the feature computation plan 512 such as the ability for a peer in the peer-list to extract the list of attributes listed in <AttributeName> but also the SamplingInterval coupled with frequency at which the related features can be computed, taking into account the delay to receive such samples and whether samples can be received according to the requirements of the local inference (e.g., local inferences made on the network element 306 by executing a model). Some local inferences may require the reception of samples with high reliability, especially when missing data is poorly handled by the machine learning model, but also according to a strict timing, while other inferences may be more tolerant to missing data and synchronicity. In other situations, local inference may not have tight requirements in terms of timing and reliability of telemetry received by peers.

The tolerance of the machine learning model used by the local network element 306 may be specified by assurance service 308, such as in terms of local-sampling frequency and tolerance to missing data. In turn, feature computation monitor 506 may then assess the QoS path characteristics from all peers listed in the peer-list to itself. In some embodiments, this may be performed by inspecting the routing topology, such as by using a revere shortest path first (SPF) and related interior gateway protocol (KW) metric, or by measurement (e.g. requesting probes to be sent from all peers in peer-list). In turn, feature computation monitor 506 may use the delay attributes from all peers in the peer-list along with probability of packet transmission success (ETX) attributes, to determine whether the required telemetry is likely to be received with the required level of synchronicity and reliability needed to perform the local inference. Note that in LLNs, path reliability and synchronicity may be particularly challenging.

In other embodiments, feature computation monitor 506 may continuously monitor the reliability of data being fetched from the peers and may raise an event when the data reliability degrades (e.g., very high latency in obtaining the data). For example, assume that network element 306a has sent a <Request_Attribute> message to network element 306n for a set of attributes. In turn, the peer FCE module 502n may begin evaluating whether it can gather the requested attributes according to the requesting sampling, and then begin collecting the corresponding attribute every <SamplingInterval> seconds. In turn, FCE module 502n may return the requested attributes back to FCE module 502a in chunks of size <ChunkSize> via an <Attribute_Values> message. For example, such a message may take the form: <Attribute_Values>::=<AttributeName><Sample>+ <Sample>::=<Ts><Value>

In a further, optional embodiment, the local network element 306 may request that the peers in its peer-list to marks the Differentiated Services Code Point (DSCP) field of the telemetry packets, so as to improve their respective QoS in reporting attributes back to the local network element 306. In other cases, such as in DETNET applications, the telemetry may be sent using a strict schedule to guarantee the delays.

On receiving an <Attribute_Values> message from FCE module 502n, FCE module 502a may cache the received values until it receives the requested attributes from all of the requested peers (e.g., until all of the peers have responded). During this time, feature computation monitor 506 may evaluate the attribute reporting process, so as to detect any problems in the process, such as peers not reporting attributes according to the desired intervals, etc., so that it can provide feedback to assurance service 308.

After FCE module 502a has received all of its requested attributes, it may use them to construct the feature vector for input to the forecasting model. For example, such a feature construction may entail calculating statistics (e.g., distribution information, averages, etc.), summaries, or the like, from the collected attributes. Note that when any peers are unreachable or do not respond, FCE module 502a may simply ignore them and move forward with the feature construction.

In some embodiments, an FCE module 502 may maintain a measure of reliability of all features that it constructs. This measure may be reduced by any missing attributes that any requested peer of the network element 306 failed to receive within the requested time interval. Such a measure can also be propagated further down the inference chain, so as to adjust the reliability of the model predictions. In other embodiments, an FCE module 502 may provide incremental updates to the local inference agent (LIE) 508 as new peers report their feature value, along with an uncertainty measure that may be obtained using Bayesian statistics or the like.

Once feature computation monitor 506 has made its determination, it may send a feedback message to assurance service 308 indicating the feasibility of network element 306 executing the model computed by service 308 using attributes collected from the peers in the peer-list, according to the set requirements (e.g., list of attributes available from peers, ability to received attribute on-time, evaluation of the percentage of missing input features due to the lack of reliability, etc.). In response to such a feedback message, service 308 may adjust the model, such as by removing input features from it or adjusting the input features according to the QoS expected when receiving the attribute telemetry from peers. Optionally, assurance service 308 may provide a list of models with different sets of features and their respective performances to feature computation monitor 506, to evaluate whether any of their executions are feasible on the network element 306.

A further component of each network element 306 may be a Local Inference Engine (LIE) 508, which takes as input the features constructed by the FCE 502 of the network element 306 and perform an inference step using one or more models received from assurance service 308 (e.g., a trained model 412, as described previously in FIG. 4C). For example, one model may forecast SLAs and tunnel failures in an SD-WAN, based on the input features constructed by FCE module 502.

In various embodiments, the inference by each LIE 508 may be adaptive in nature such that when the local FCE module 502 provides incremental updates, LIE 508 may adjust different aspects of the inference process based on the QoS and/or reliability of the underlying features. For example, assume that network element 306a determines that the QoS and reliability of the telemetry attributes from its peers is not as expected, LIE 508a may utilize a trained model that does not require any so-called remote features, even though this model is likely to exhibit less accuracy than one that does. In another case, LIE 508a may utilize a model that still requires remote features, but provides a larger uncertainty estimate for the predictions. Whenever possible, a LIE 508 may try to select an approach that optimizes the expected accuracy of the model.

In further embodiments, each LIE 508 may receive, via an application programming interface (API), either or both of the following parameters:
Expected Accuracy: an expected accuracy for the prediction (typically expressed as a threshold on the relative error in regression tasks or the F1-score in classification tasks)
Acceptable Delay (optional): optionally, the LIE 508 may also report a acceptable delay in the prediction (e.g., measured in seconds, etc.).

Based on either or both of the parameters, the LIE 508 may also delay its inference, to achieve higher expected accuracy by waiting for more accurate remote features from the FCE 502.

Figure 6:
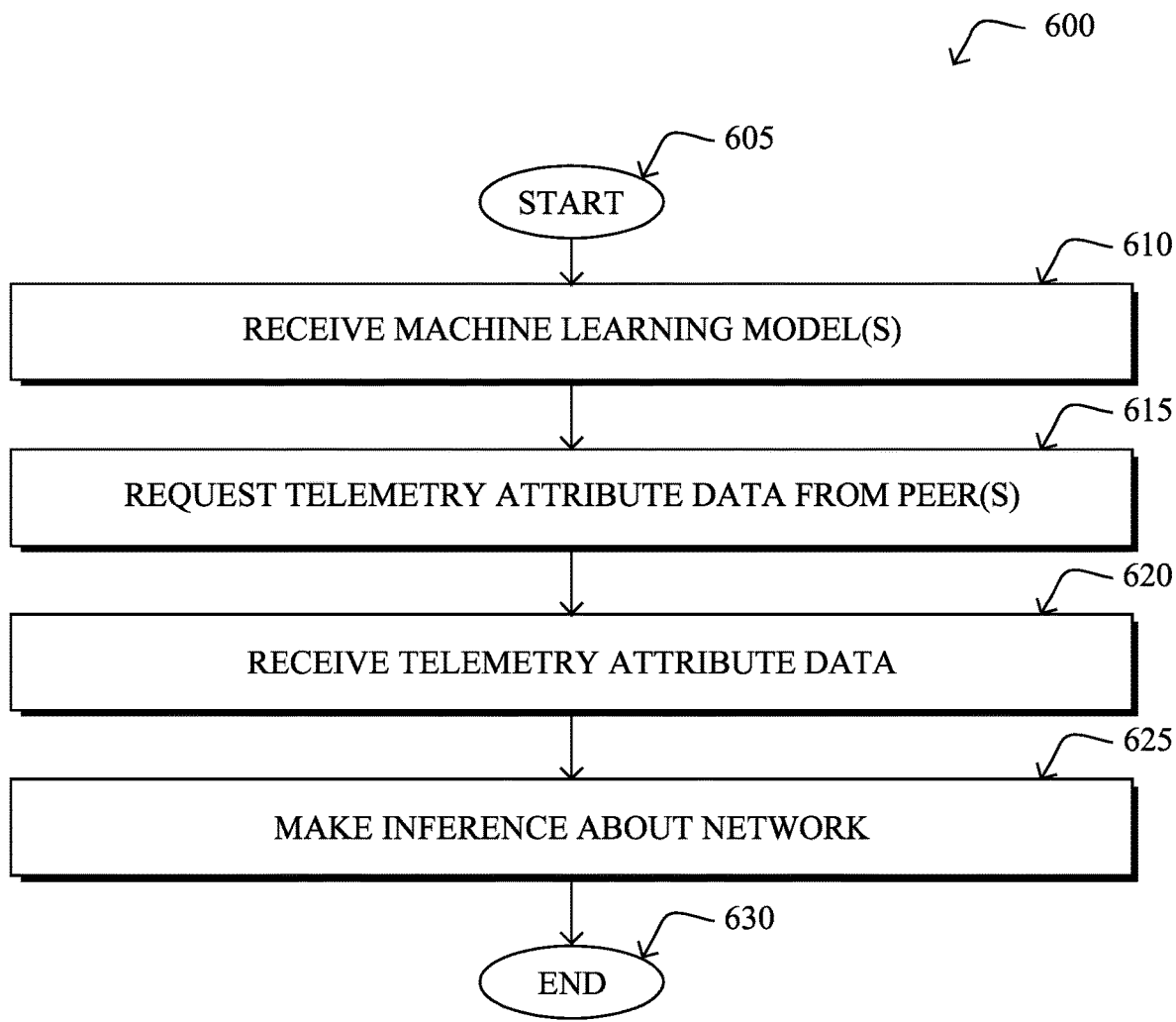
FIG. 6 illustrates an example simplified procedure for using peer telemetry attribute data to make an inference about a network.

As noted previously, any inferences made by a LIE 508 can be used by the local network element 306 to initiate corrective measures such as, but not limited to, rerouting traffic onto a different tunnel or network path, sending an alert, changing a configuration of another device, or the like. In addition, FIG. 6 illustrates an example simplified procedure 600 for using peer telemetry attribute data to make an inference about a network, in accordance with one or more embodiments described herein. For example, a non-generic, specifically configured device may perform procedure 600 by executing stored instructions, such as a network element (e.g., a router, switch, etc.). The procedure 600 may start at step 605, and continues to step 610, where, as described in greater detail above, the network element may receive one or more machine learning models configured to make an inference about the network. For example, the network element may receive the model(s) from a network assurance service that is cloud-based and trains the model(s). In various embodiments, the inference may be a forecast KPI or other value that can be used to indicate a potential problem in the network. For instance, the inference may be that an SD-WAN tunnel is likely to fail, that an onboarding or roaming issue is going to occur in a wireless network, or the like.

At step 615, as detailed above, the network element may request, according to a predefined peering plan, telemetry attribute data from one or more peer network elements specified by the peering plan. In various embodiments, the peering plan may specify which of the telemetry attribute data is available from each of the one or more peer network elements. In addition, the peering plan may assign the one or more peer network elements to a modality representative of a particular geographic location in a network, a network topology, or an autonomous system. This allows the network element to request different types of telemetry attribute data from different peers, according to their modalities. For instance, the network element may request RSSI data from its peers in a Geo modality and client count information from its peers in an L2 modality. In further embodiments, the network element may request that the peer(s) send the telemetry attribute data to the network element within a specified time interval.

At step 620, the network element may receive the telemetry attribute data from the one or more peer network elements, as described in greater detail above. In addition, the network element may track whether it did not receive any requested telemetry attribute data from a peer within a time interval. In such a case, the network element may notify its supervisory service, so as to compute a new peering plan or another machine learning model that does not require the missing data.

At step 625, as detailed above, the network element may make an inference about the network based in part on the received telemetry attribute data and using the one or more machine learning models. For example, the network element may construct a set of feature data from the received telemetry attribute data for input to the one or more machine learning models, according to a feature computation plan. In many cases, such a construction may be achieved in part by combining the received telemetry attribute data with local telemetry attribute data of the network element. In various embodiments, the network element may also select a particular one of the plurality of machine learning models to make the inference, based on a determination as to whether the network element received the requested telemetry attribute data from the one or more peers within the specified time interval. For example, if the network element did not receive all of its requested telemetry attribute data within a certain timeframe, it may opt to use a model that does not require this data, even if that model has a lower accuracy than another model. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for machine learning inferences to be made locally on a networking element using forecasting models and leveraging network telemetry attribute data from other peers of the networking element.

While there have been shown and described illustrative embodiments that provide for peer-to-peer feature exchange for edge inference of forecasting models, it is to be understood that various other adaptations and modifications may be made within the spirit and scope of the embodiments herein. For example, while certain embodiments are described herein with respect to using certain models for purposes of KPI forecasting, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a network element in a network, one or more machine learning models configured to make an inference about the network;
requesting, by the network element and according to a predefined peering plan, telemetry attribute data from one or more peer network elements specified by the peering plan, wherein the peering plan lists a type of the telemetry attribute data to be requested by the network element as well as a listing of the one or more peer network elements;
receiving, at the network element, the telemetry attribute data from the one or more peer network elements; and
making, by the network element and using the one or more machine learning models, the inference about the network based in part on the received telemetry attribute data.

2. The method as in claim 1, wherein making the inference about the network based in part on the received telemetry attribute data comprises:
constructing a set of feature data from the received telemetry attribute data for input to the one or more machine learning models, according to a feature computation plan.

3. The method as in claim 2, wherein constructing the set of feature data from the received telemetry attribute data for input to the one or more machine learning models comprises:
combining the received telemetry attribute data with local telemetry attribute data of the network element.

4. The method as in claim 1, wherein the one or more machine learning models comprises a plurality of machine learning models, and wherein requesting telemetry attribute data from one or more peer network elements specified by the peering plan comprises:
requesting that the one or more peer network elements send the telemetry attribute data to the network element within a specified time interval.

5. The method as in claim 4, wherein the one or more machine learning models comprises a plurality of different machine learning models, and wherein making the inference about the network based in part on the received telemetry attribute data comprises:
selecting a particular one of the plurality of machine learning models to make the inference, based on a determination as to whether the network element received the requested telemetry attribute data from the one or more peers within the specified time interval.

6. The method as in claim 1, wherein the peering plan specifies which of the telemetry attribute data is available from each of the one or more peer network elements and assigns the one or more peer network elements to a modality representative of a particular geographic location in a network, a network topology, or an autonomous system.

7. The method as in claim 1, wherein the network element is a router at an edge of the network.

8. The method as in claim 1, further comprising:
sending, by the network element, feedback regarding the inference to a network assurance service that supervises the network element and the one or more peer network elements.

9. The method as in claim 1, wherein making the inference about the network based in part on the received telemetry attribute data comprises:
delaying making the inference to improve an accuracy associated with the inference.

10. An apparatus, comprising:
one or more network interfaces;
a processor coupled to the network interfaces and configured to execute one or more processes; and
a memory configured to store a process executable by the processor, the process when executed configured to:
receive one or more machine learning models configured to make an inference about the network;
request, according to a predefined peering plan, telemetry attribute data from one or more peer network elements specified by the peering plan;
receive the telemetry attribute data from the one or more peer network elements, wherein the peering plan lists a type of the telemetry attribute data to be requested by the network element as well as a listing of the one or more peer network elements; and
make, using the one or more machine learning models, the inference about the network based in part on the received telemetry attribute data.

11. The apparatus as in claim 10, wherein the apparatus makes the inference about the network based in part on the received telemetry attribute data by:
constructing a set of feature data from the received telemetry attribute data for input to the one or more machine learning models, according to a feature computation plan.

12. The apparatus as in claim 11, wherein the apparatus constructs the set of feature data from the received telemetry attribute data for input to the one or more machine learning models by:
combining the received telemetry attribute data with local telemetry attribute data of the apparatus.

13. The apparatus as in claim 10, wherein the one or more machine learning models comprises a plurality of machine learning models, and wherein the apparatus requests telemetry attribute data from one or more peer network elements specified by the peering plan by:
requesting that the one or more peer network elements send the telemetry attribute data to the apparatus within a specified time interval.

14. The apparatus as in claim 13, wherein the one or more machine learning models comprises a plurality of different machine learning models, and wherein the apparatus makes the inference about the network based in part on the received telemetry attribute data by:
selecting a particular one of the plurality of machine learning models to make the inference, based on a determination as to whether the apparatus received the requested telemetry attribute data from the one or more peers within the specified time interval.

15. The apparatus as in claim 14, wherein the peering plan specifies which of the telemetry attribute data is available from each of the one or more peer network elements and assigns the one or more peer network elements to a modality representative of a particular geographic location in a network, a network topology, or an autonomous system.

16. The apparatus as in claim 14, wherein the apparatus is a router at an edge of the network.

17. The apparatus as in claim 10, wherein the inference about the network comprises a prediction of a failure of the network.

18. The apparatus as in claim 10, wherein the peering plan specifies a set of peers for each of a plurality of modalities.

19. A tangible, non-transitory, computer-readable medium storing program instructions that cause a network element to execute a process comprising:

receiving, at the network element in a network, one or more machine learning models configured to make an inference about the network;

requesting, by the network element and according to a predefined peering plan, telemetry attribute data from one or more peer network elements specified by the peering plan, wherein the peering plan lists a type of the telemetry attribute data to be requested by the network element as well as a listing of the one or more peer network elements;

receiving, at the network element, the telemetry attribute data from the one or more peer network elements; and making, by the network element and using the one or more machine learning models, the inference about the network based in part on the received telemetry attribute data.

20. The computer-readable medium as in claim 19, wherein making the inference about the network based in part on the received telemetry attribute data comprises:

constructing a set of feature data from the received telemetry attribute data for input to the one or more machine learning models, according to a feature computation plan.

\* \* \* \* \*

UNITED STATES PATENT AND TRADEMARK OFFICE
CERTIFICATE OF CORRECTION

PATENT NO. : 11,677,819 B2
APPLICATION NO. : 16/831222
DATED : June 13, 2023
INVENTOR(S) : Grégory Mermoud It is certified that error appears in the above-identified patent and that said Letters Patent is hereby corrected as shown below:

In the Specification

Column 14, Line 52, please amend as shown:
(GR) 504, which is in charge of determining the set of Column 15, Line 47, please amend as shown:
(SPF) and related interior gateway protocol (IGP) metric, or Column 17, Line 27, please amend as shown:
also report an acceptable delay in the prediction (e.g., Signed and Sealed this
Fifth Day of September, 2023

Katherine Kelly Vidal
*Director of the United States Patent and Trademark Office*